(12) United States Patent
Kim et al.

(10) Patent No.: US 12,728,703 B2
(45) Date of Patent: Sep. 8, 2026

(54) HEAT PUMP SYSTEM FOR A VEHICLE

(71) Applicants: HYUNDAI MOTOR COMPANY, Seoul (KR); KIA CORPORATION, Seoul (KR)

(72) Inventors: Jeawan Kim, Hwaseong-si (KR); Hochan An, Hwaseong-si (KR); Yeonho Kim, Seoul (KR); Hoyoung Jeong, Hwaseong-si (KR); Man Hee Park, Suwon-si (KR); Yeong Jun Kim, Incheon (KR); Jae Yeon Kim, Hwaseong-si (KR); Gwi Taek Kim, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 121 days.

(21) Appl. No.: 18/656,179

(22) Filed: May 6, 2024

(65) Prior Publication Data

US 2025/0187406 A1 Jun. 12, 2025

(30) Foreign Application Priority Data

Dec. 7, 2023 (KR) ........................ 10-2023-0176612

(51) Int. Cl.
*B60H 1/32* (2006.01)

(52) U.S. Cl.
CPC ................................ *B60H 1/32284* (2019.05)

(58) Field of Classification Search
CPC ............ B60H 1/32284; B60H 1/00499; B60H 1/00492
See application file for complete search history.

(56) References Cited

U.S. PATENT DOCUMENTS 6,178,929 B1 * 1/2001 Schatz ............... B60H 1/00492 123/41.14
2006/0032623 A1 * 2/2006 Tsubone .................. F28D 20/00 165/202
2013/0192272 A1 * 8/2013 Ranalli ................... B60L 1/003 62/3.3
2014/0041826 A1 * 2/2014 Takeuchi .................. B60L 1/08 165/10
2016/0318370 A1 * 11/2016 Rawlinson ......... B60H 1/32281
2022/0325930 A1 * 10/2022 Day ................... B60H 1/00907

FOREIGN PATENT DOCUMENTS

CN 109983287 A * 7/2019 .............. F25B 49/02

OTHER PUBLICATIONS

CN-109983287-A Translation (Year: 2019).*

(Continued)

*Primary Examiner* — David J Teitelbaum
(74) *Attorney, Agent, or Firm* — Lempia Summerfield Katz LLC

(57) ABSTRACT

A heat pump system for a vehicle may increase the temperature of the coolant by selectively using the heat supplied from air conditioner unit where the refrigerant circulates, or the heat supplied from a heat storage device, and thus may efficiently heat the vehicle interior by using the coolant whose temperature is increased.

12 Claims, 4 Drawing Sheets

(56) References Cited

OTHER PUBLICATIONS

Peng Xie et al., Thermal energy storage for electric vehicles at low temperatures: Concepts, systems, devices and materials; Renewable and Sustainable Energy Reviews; vol. 160, May 2022, pp. 112263.

Valeria Palomba et al., Thermal performance of a latent thermal energy storage for exploitation of renewables and waste heat: An experimental investigation based on an asymmetric plate heat exchanger; Energy Conversion and Management; vol. 200, Nov. 2019, pp. 112121.

* cited by examiner 10
20
30
11
40
11
50
52
12
11
62
60
11
11
100
102
130
102
120
110
102
102
140

10
20
30
40
11
11
11
11
11
50
52
12
62
60
100
102
102
102
102
110
120
130
140

HEAT PUMP SYSTEM FOR A VEHICLE

CROSS-REFERENCE TO RELATED APPLICATION

This application claims priority to and the benefit of Korean Patent Application No. 10-2023-0176612, filed in the Korean Intellectual Property Office on Dec. 7, 2023, the entire contents of which is incorporated herein by reference.

BACKGROUND

(a) Field

The present disclosure relates to a heat pump system for a vehicle. More particularly, the present disclosure relates to a heat pump system for a vehicle capable of heating a vehicle interior by using a high-temperature coolant.

(b) Description of the Related Art

Generally, an air conditioning system for a vehicle includes an air conditioner unit circulating a refrigerant in order to heat or cool an interior of the vehicle.

The air conditioner unit can maintain the interior of the vehicle at an appropriate temperature regardless of a change in an external temperature to maintain a comfortable interior environment of the vehicle. The air conditioner unit is configured to heat or cool the interior of the vehicle through heat-exchange using a condenser and an evaporator in a process in which a refrigerant discharged by a compressor is circulated through the condenser, a receiver drier, an expansion valve, and the evaporator, and then back to the compressor.

In other words, the air conditioner unit lowers a temperature and a humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

An environment-friendly technology of a vehicle becomes a core technology of a future automobile industry, and advanced car makers have focused on the development of an environmentally-friendly vehicle to comply with environmental and fuel efficiency regulations.

Recently, in accordance with a continuous increase in interest in energy efficiency and an environmental pollution problem, the development of an environmentally-friendly vehicle capable of substantially substituting for an internal combustion engine vehicle is required, and the environmentally-friendly vehicle is classified into an electric vehicle driven using a fuel cell or electricity as a power source and a hybrid vehicle driven using an engine and electric power from a battery.

Here, electric vehicles use, as primary power source, a battery module in which a plurality of rechargeable batteries (i.e., cells) capable of charging and discharging are formed into one pack, and therefore, does not produce the exhaust gas and its noise is very small.

An air conditioning apparatus applied to such an environment-friendly vehicle is typically referred to as a heat pump system.

However, when heating of the vehicle interior is required, an electric vehicle applied with a heat pump system mainly uses an electric heater due to insufficient heat sources, and accordingly, there is a drawback in that the heating performance is deteriorated, power consumption of the compressor is increased, and consumption of the battery is highly increased due to usage of the electric heater.

In addition, there is a disadvantage that the overall driving distance of the vehicle is shortened due to excessive usage of the battery, and accordingly, the overall marketability of the electric vehicle is deteriorated.

The above information disclosed in this Background section is only provided to enhance understanding of the background of the present disclosure, and therefore it may contain information that does not form the prior art that is already known to a person of ordinary skill in the art.

SUMMARY

The present disclosure provides a heat pump system for a vehicle capable of increasing the temperature of the coolant by selectively using the heat supplied from air conditioner unit where the refrigerant circulates, or the heat supplied from a heat storage device, and efficiently heating the vehicle interior by using a coolant whose temperature is increased.

In an embodiment of the present disclosure, a heat pump system for a vehicle may include a vehicle interior heating device including a heat storage device, a water pump, and a heater core, which are connected to each other directly or indirectly through a coolant line through which a coolant flows. The system also includes: an air conditioner unit including a compressor, a condenser, an expansion valve, and an evaporator, which are directly or indirectly connected to each other through a refrigerant line through which a refrigerant flows. In particular, the condenser is provided on the coolant line between the heat storage device and the water pump to flow the coolant and configured to condense the refrigerant through heat-exchange with the coolant. The flow of the coolant is controlled depending on at least one mode for heating the vehicle interior.

The vehicle interior heating device may further include: a first valve provided on the coolant line between the heat storage device and the heater core; a first connection line having a first end connected to the first valve and a second end connected to the coolant line between the heat storage device and the condenser; a second valve provided on the coolant line between the heat storage device and the condenser; and a second connection line having a first end connected to the second valve and a second end connected to the coolant line between the condenser and the water pump.

When the heat storage device has exhausted all of the stored heat, the first valve may open the first connection line such that the coolant may not flow to the heat storage device, and may close the coolant line connecting the first valve and the heat storage device.

To increase a temperature of the coolant by using the heat stored in the heat storage device, the second valve may open the second connection line, and may close the coolant line connecting the condenser and the second valve.

The first valve and the second valve may be a 3-way valve capable of distributing flow amounts while controlling the flow of the coolant.

The at least one mode may include: a first mode for heating the vehicle interior by using the heat stored in the heat storage device, a second mode for heating the vehicle interior by simultaneously using the heat stored in the heat storage device and the heat supplied from the air conditioner unit, and a third mode for heating the vehicle interior by using the heat supplied from the air conditioner unit.

In the first mode, the coolant line connecting the heat storage device and the heater core may be opened by an operation of the first valve, the coolant line connecting the condenser and the second valve may be closed by an operation of the second valve, the coolant line connecting a second end of the second connection line and the condenser may be closed, the first connection line may be closed by the operation of the first valve, the second connection line may be opened by the operation of the second valve, the coolant may circulate along the coolant line and the second connection line by an operation of the water pump, in the vehicle interior heating device, the heat storage device may increase a temperature of the coolant introduced through the coolant line such that the high-temperature coolant may be supplied to the heater core, and an operation of the air conditioner unit may be stopped.

The first mode may be operated when a temperature of the heat storage device is higher than a heating target temperature.

In the second mode, the coolant line connecting the heat storage device and the heater core may be opened by an operation of the first valve, the coolant line connecting the heat storage device and the condenser may be opened by an operation of the second valve, the first connection line may be closed by the operation of the first valve, and the second connection line may be closed by the operation of the second valve. In particular, the heat storage device, the water pump, the heater core, and the condenser may be interconnected through the coolant line, the coolant may circulate along the coolant line by an operation of the water pump, the air conditioner unit may be operated, and the condenser and the heat storage device may increase a temperature of the coolant introduced through the coolant line such that the high-temperature coolant may be supplied to the heater core.

The second mode may be operated when a temperature of the heat storage device is lower than the temperature of the refrigerant discharged from the compressor.

In the third mode, the coolant line connecting the heat storage device and the first valve may be closed by an operation of the first valve, the coolant line connecting the heat storage device and the condenser may be closed by an operation of the second valve, the first connection line may be opened by the operation of the first valve, the second connection line may be closed by the operation of the second valve, the coolant may circulate along the coolant line and the first connection line opened by an operation of the water pump, the air conditioner unit may be operated, and the condenser may exchange heat between the coolant introduced through the coolant line and the refrigerant to increase a temperature of the coolant such that the high-temperature coolant may be supplied to the heater core.

The third mode may be operated when a temperature of the heat storage device is lower than the temperature of the refrigerant discharged from the compressor, and the heat stored in the heat storage device are completely exhausted.

The vehicle interior heating device may further include a coolant heater provided on the coolant line between the water pump and the heater core.

When the temperature of air discharged into the vehicle interior is lower than a heating target temperature in the at least one mode, the coolant heater may be operated to heat the coolant supplied to the heater core along the coolant line.

The heat storage device may be filled with a phase-change material.

As described above, according to a heat pump system for a vehicle according to an embodiment, the temperature of the coolant can be increased by selectively using the heat supplied from either air conditioner unit, where the refrigerant circulates, or from a heat storage device. The vehicle interior can then be efficiently heated using the coolant with the increased temperature.

In addition, according to the present disclosure, the heating performance by using the heat storage device may be maximized while minimizing the required components, and accordingly, streamlining and simplification of the system may be achieved.

In addition, according to the present disclosure, for heating the vehicle interior, usage of an electric heater may be minimized, such that the battery consumption may be reduced, and the overall driving distance of the vehicle may be increased.

In addition, according to an embodiment, it is possible to improve space utilization and also reduce manufacturing cost and weight through simplification of an entire system.

DETAILED DESCRIPTION

Figure 1:
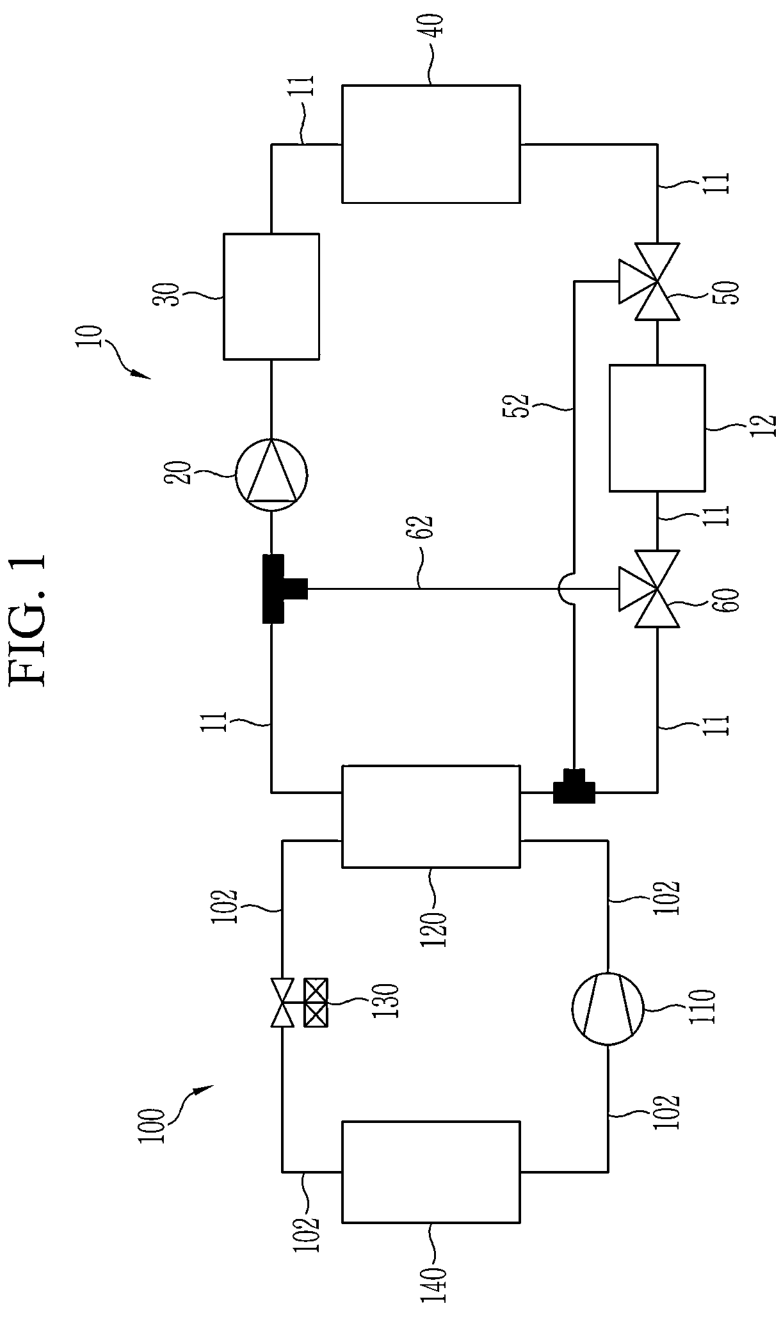
FIG. 1 is a block diagram of a heat pump system for a vehicle according to an embodiment.

Some embodiments are hereinafter described in detail with reference to the accompanying drawings.

Embodiments disclosed in the present specification and the constructions depicted in the drawings are only example embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted, and the same elements or equivalents are referred to with the same reference numerals throughout the specification.

Also, the size and thickness of each element are arbitrarily shown in the drawings, but the present disclosure is not necessarily limited thereto, and in the drawings, the thickness of layers, films, panels, regions, etc., are exaggerated for clarity.

In addition, unless explicitly described to the contrary, the word "comprise" and variations such as "comprises" or "comprising", should be understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

When a component, device, element, or the like of the present disclosure is described as having a purpose or performing an operation, function, or the like, the component, device, or element should be considered herein as being "configured to" meet that purpose or to perform that operation or function.

FIG. 1 is a block diagram of a heat pump system for a vehicle according to an embodiment.

According to a heat pump system for a vehicle according to an embodiment, a temperature of a coolant may be increased by selectively using the heat supplied from an air conditioner unit 100 where a refrigerant circulates, or the heat supplied from a heat storage device 12, and a vehicle interior may be efficiently heated by using the coolant whose temperature is increased.

For such a purpose, the heat pump system according to an embodiment may include the vehicle interior heating device 10 and the air conditioner unit 100.

Referring to FIG. 1, the air conditioner unit 100 may include a compressor 110, a condenser 120, an expansion valve 130, and an evaporator 140, which are connected to each other through the refrigerant line 102 through which the refrigerant flows.

The compressor 110 may compress the refrigerant introduced through the refrigerant line 102 and may discharge the compressed refrigerant to the refrigerant line 102.

The condenser 120 may condense the refrigerant introduced from the compressor 110 through the refrigerant line 102 through heat-exchange with operation fluid.

The expansion valve 130 may expand the refrigerant introduced from the condenser 120 through the refrigerant line 102.

In addition, the evaporator 140 may evaporate the refrigerant introduced from the expansion valve 130 through the refrigerant line 102 through heat-exchange with operation fluid.

The evaporated refrigerant at the evaporator 140 may be introduced into the compressor 110 along the refrigerant line 102. While repeatedly performing the above-described processes, the air conditioner unit 100 may circulate the refrigerant, and may supply the thermal energy generated during the phase change of the refrigerant to the vehicle interior heating device 10.

In the present embodiment, the vehicle interior heating device 10 may include the heat storage device 12, a water pump 20, and a heater core 40, which are connected to each other through the coolant line 11 through which the coolant flows.

The heat storage device 12 may be filled with a phase-change material.

Here, the phase-change material may be used in order to store the energy or constantly maintain the temperature, by using a large heat absorption and dissipation effect of the latent heat absorbing or dissipating the heat when a thermodynamic process of changing the material into different state, that is, gas, liquid, and solid states according to the temperature and the pressure occurs, and in the present embodiment, may be employed to increase the temperature of the coolant by using the absorbed thermal energy.

Here, the condenser 120 may be provided on the coolant line 11 between the heat storage device 12 and the water pump 20 to flow the coolant to condense the refrigerant through heat-exchange with the coolant.

In other words, the condenser 120 may exchange heat between the coolant introduced through the coolant line 11 and the refrigerant introduced through the refrigerant line 102 to condense the refrigerant. At the same time, the condenser 120 may discharge the coolant whose temperature is increased while being heat-exchanged with the refrigerant to the coolant line 11.

The water pump 20 may be provided on the coolant line 11 between the heat storage device 12 and the heater core 40. The water pump 20 may be operated to flow the coolant along the coolant line 11.

In one embodiment, the heater core 40 may be provided on the coolant line 11 between the water pump 20 and the heat storage device 12.

The heater core 40 may be provided inside of a HVAC module (not shown). Accordingly, the high-temperature coolant supplied to the heater core 40 through the coolant line 11 may increase the temperature of the ambient air passing through the heater core 40. In other words, the introduced ambient air may be converted to a high-temperature state while passing through the heater core 40 and then introduced into the vehicle interior, thereby implementing heating of the vehicle interior.

Here, the vehicle interior heating device 10 may further include the coolant heater 30 provided on the coolant line 11 between the water pump 20 and the heater core 40.

The coolant heater 30 may be operated when the temperature of the coolant supplied to the heater core 40 is lower than a target temperature, thereby heating the coolant circulating through the coolant line 11. Accordingly, the coolant whose temperature is increased while passing through the coolant heater 30 may be supplied to the heater core 40.

Here, when the temperature of air discharged into the vehicle interior is lower than a heating target temperature, the coolant heater 30 may be operated to heat the coolant supplied to the heater core 40 along the coolant line 11.

In other words, the coolant heater 30 may be selectively operated based on the temperature of the coolant supplied to the heater core 40 to heat the coolant.

In the present embodiment, the vehicle interior heating device 10 may further include a first valve 50, a first connection line 52, a second valve 60, and a second connection line 62.

The first valve 50 may be provided on the coolant line 11 between the heat storage device 12 and the heater core 40.

A first end of the first connection line 52 may be connected to the first valve 50. A second end of the first connection line 52 may be connected to the coolant line 11 between the heat storage device 12 and the condenser 120.

Here, when the heat storage device 12 has exhausted all of the stored heat, the first valve 50 may open the first connection line 52 such that the coolant may not flow to the heat storage device 12.

Simultaneously, the first valve 50 may close the coolant line 11 connecting the first valve 50 and the heat storage device 12.

In the present embodiment, the second valve 60 may be provided on the coolant line 11 between the heat storage device 12 and the condenser 120.

A first end of the second connection line 62 may be connected to the second valve 60. A second end of the second connection line 62 may be connected to the coolant line 11 between the condenser 120 and the water pump 20.

Here, the second valve 60 may open the second connection line 62 and may close the coolant line 11 connecting the condenser 120 and the second valve 60 such that the temperature of the coolant increases by the heat stored in the heat storage device 12.

In other words, when the heat supplied from the heat storage device 12 is sufficient at the time of heating the vehicle interior, the second valve 60 may open the second connection line 62 to perform heating by using only the heat storage device 12 without the heat supplied from the air conditioner unit 100.

To the contrary, when it is necessary to receive heat from the air conditioner unit 100 together with the heat supplied from the heat storage device 12 at the time of heating the vehicle interior, the second valve 60 may close the second connection line 62.

At the same time, the second valve 60 may open the coolant line 11 connecting the condenser 120 and the second valve 60 such that the coolant may be supplied to the condenser 120.

In one form, the first valve 50 and the second valve 60 may be a 3-way valve capable of distributing the flow amount while controlling the flow of the coolant.

According to the heat pump system configured as such, the flow of the coolant may be controlled depending on at least one mode for heating the vehicle interior.

Here, the at least one mode may include a first mode to a third mode.

In the first mode, the vehicle interior may be heated by using the heat stored in the heat storage device 12.

In the second mode, the vehicle interior may be heated by simultaneously using the heat stored in the heat storage device 12 and the heat supplied from the air conditioner unit 100.

In addition, in the third mode, the vehicle interior may be heated by using the heat supplied from the air conditioner unit 100.

Hereinafter, an operation of a heat pump system for a vehicle according to an embodiment configured as described above is described in detail with reference to FIG. 2 to FIG. 4.

According to an embodiment, an operation in the first mode of a heat pump system for a vehicle, which is for heating the vehicle interior by using the heat stored in the heat storage device 12, is described in detail with reference to FIG. 2.

Figure 2:
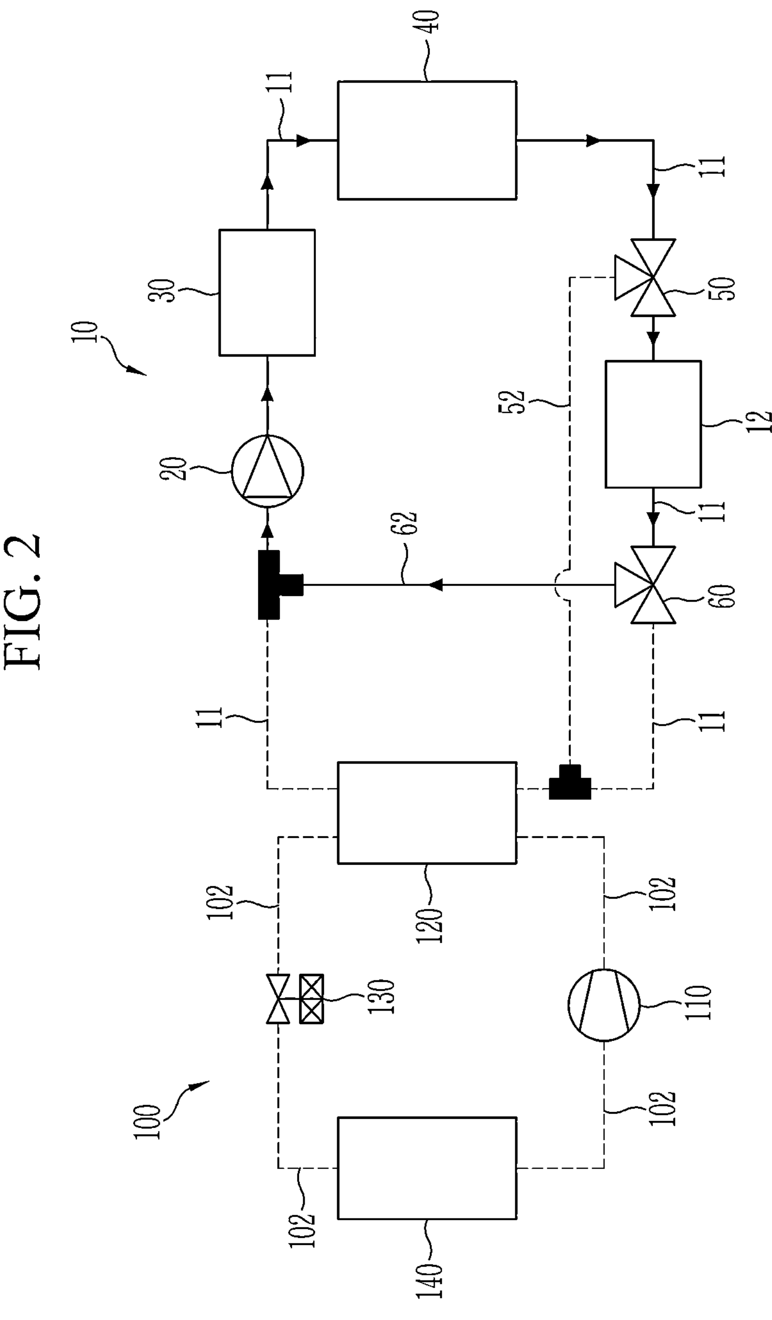
FIG. 2 is an operation diagram according to a first mode of a heat pump system for a vehicle according to an embodiment.

FIG. 2 is an operation diagram according to the first mode of a heat pump system for a vehicle according to an embodiment.

Referring to FIG. 2, in the first mode, the coolant line 11 connecting the condenser 120 and the second valve 60 may be closed by an operation of the second valve 60. At the same time, the coolant line 11 connecting the second end of the second connection line 62 and the condenser 120 may be closed.

In addition, the coolant line 11 connecting the heat storage device 12 and the heater core 40 may be opened by an operation of the first valve 50.

Here, the first connection line 52 may be closed by the operation of the first valve 50. The second connection line 62 may be opened by the operation of the second valve 60.

Meanwhile, an operation of the air conditioner unit 100 may be stopped.

In such a state, in the vehicle interior heating device 10, the coolant may circulate along the coolant line 11 and the second connection line 62 opened by an operation of the water pump 20.

At this time, the heat storage device 12 may increase the temperature of the coolant introduced through the coolant line 11 such that the high-temperature coolant may be supplied to the heater core 40.

In other words, the temperature of the coolant increases while passing through the heat storage device 12 and the coolant is introduced into the second valve 60 along the coolant line 11. Thereafter, the coolant may flow from the second valve 60 along the second connection line 62.

The coolant flowing through the second connection line 62 may sequentially pass through the water pump 20 and the coolant heater 30 along the coolant line 11 and be introduced into the heater core 40.

Here, the high-temperature coolant introduced into the heater core 40 may increase the temperature of the ambient air passing through the heater core 40. In other words, the introduced ambient air may be converted to a high-temperature state while passing through the heater core 40 and then introduced into the vehicle interior, thereby implementing heating of the vehicle interior.

In addition, the coolant having passed through the heater core 40 may be introduced into the heat storage device 12 along the coolant line 11.

While repeatedly performing the above-described processes, the heat pump system may smoothly heat the vehicle interior by using the heat stored in the heat storage device 12.

The first mode operated as above may be performed when the temperature of the phase-change material stored in the heat storage device 12 is higher than a target temperature (namely, a heating target temperature).

Meanwhile, when the temperature of air discharged into the vehicle interior is lower than the target temperature in the first mode, the coolant heater 30 may be operated to heat the coolant supplied to the heater core 40 along the coolant line 11.

In other words, the coolant heater 30 may heat the coolant introduced through the coolant line 11 such that the temperature of the coolant supplied to the heater core 40 may be increased.

According to an embodiment, an operation in the second mode of the heat pump system, which is for heating the vehicle interior by simultaneously using the heat stored in the heat storage device 12 and the heat supplied from the air conditioner unit 100, is described in detail with reference to FIG. 3.

Figure 3:
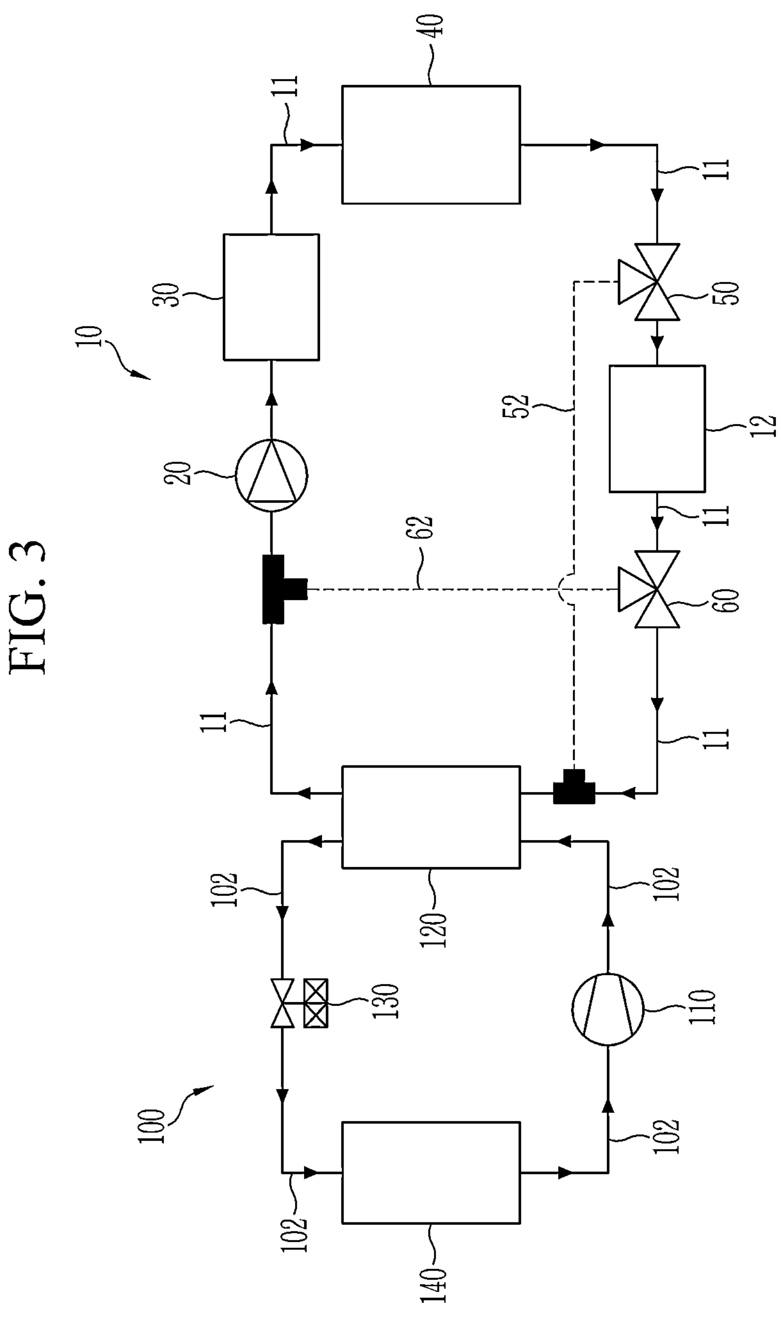
FIG. 3 is an operation diagram according to a second mode of a heat pump system for a vehicle according to an embodiment.

FIG. 3 is an operation diagram according to the second mode of a heat pump system for a vehicle according to an embodiment.

Referring to FIG. 3, in the second mode, the coolant line 11 connecting the heat storage device 12 and the heater core 40 may be opened by the operation of the first valve 50.

In addition, the coolant line 11 connecting the heat storage device 12 and the condenser 120 may be opened by the operation of the second valve 60.

The first connection line 52 may be closed by the operation of the first valve 50. At the same time, the second connection line 62 may be closed by the operation of the second valve 60.

In addition, the air conditioner unit 100 may be operated such that the refrigerant may be supplied from the compressor 110 to the condenser 120.

Accordingly, the heat storage device 12, the water pump 20, the coolant heater 30, the heater core 40, and the condenser 120 may be interconnected through the coolant line 11.

In such a state, in the vehicle interior heating device 10, the coolant may be circulated along the coolant line 11 by the operation of the water pump 20.

Here, the heat storage device 12 may increase the temperature of the coolant introduced through the coolant line 11 such that the high-temperature coolant may be supplied to the heater core 40.

In addition, the condenser 120 may exchange heat between the coolant introduced from the heat storage device 12 through the coolant line 11 and the refrigerant introduced from the compressor 110 through the refrigerant line 102 so as to further increase the temperature of the coolant.

In other words, the condenser 120 and the heat storage device 12 may increase the temperature of the coolant introduced through the coolant line 11 such that the high-temperature coolant may be supplied to the heater core 40.

Accordingly, the heat storage device 12 and the coolant whose temperature is increased while passing through the condenser 120 may sequentially pass through the water pump 20 and the coolant heater 30 along the coolant line 11, and be introduced into the heater core 40.

Here, the high-temperature coolant introduced into the heater core 40 may increase the temperature of the ambient air passing through the heater core 40. In other words, the introduced ambient air may be converted to a high-temperature state while passing through the heater core 40 and then introduced into the vehicle interior, thereby implementing heating of the vehicle interior.

In addition, the coolant having passed through the heater core 40 may be introduced into the heat storage device 12 along the coolant line 11.

While repeatedly performing the above-described processes, the heat pump system may smoothly heat the vehicle interior by simultaneously using the heat stored in the heat storage device 12 and the heat supplied from the air conditioner unit 100 through the condenser 120.

The second mode operated as above may be operated when the temperature of the phase-change material stored in the heat storage device 12 is lower than the temperature of the refrigerant discharged from the compressor 110.

Meanwhile, when the temperature of air discharged into the vehicle interior is lower than the target temperature in the second mode, the coolant heater 30 may be operated to heat the coolant supplied to the heater core 40 along the coolant line 11.

In other words, the coolant heater 30 may heat the coolant introduced through the coolant line 11 such that the temperature of the coolant supplied to the heater core 40 may be increased.

In addition, an operation in the third mode of the heat pump system, which is for heating the vehicle interior by using the heat supplied from the air conditioner unit 100, is described in detail with reference to FIG. 4.

Figure 4:
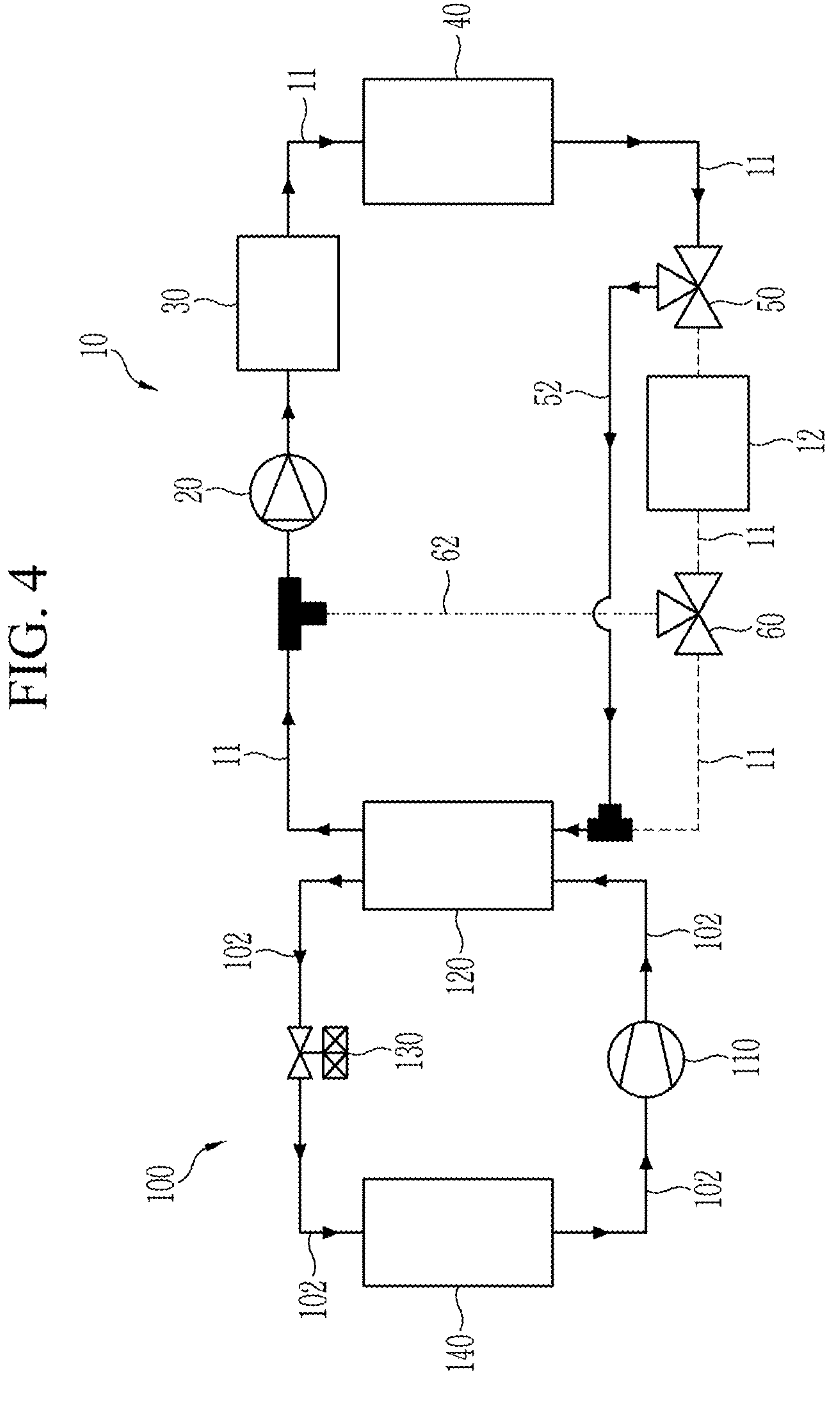
FIG. 4 is an operation diagram according to a third mode of a heat pump system for a vehicle according to an embodiment.

FIG. 4 is an operation diagram according to the third mode of a heat pump system for a vehicle according to an embodiment.

Referring to FIG. 4, in the third mode, the coolant line 11 connecting the heat storage device 12 and the first valve 50 may be closed by the operation of the first valve 50.

Simultaneously, the coolant line 11 connecting the heat storage device 12 and the condenser 120 may be closed by the operation of the second valve 60.

The first connection line 52 may be opened by the operation of the first valve 50. In addition, the second connection line 62 may be closed by the operation of the second valve 60.

In addition, the air conditioner unit 100 may be operated such that the refrigerant may be supplied from the compressor 110 to the condenser 120.

In such a state, in the vehicle interior heating device 10, the coolant may circulate along the coolant line 11 and the first connection line 52 opened by the operation of the water pump 20.

At this time, the condenser 120 may exchange heat between the coolant introduced from the first connection line 52 through the coolant line 11 and the refrigerant introduced from the compressor 110 through the refrigerant line 102 to increase the temperature of the coolant.

In other words, the condenser 120 may exchange heat between the coolant introduced through the coolant line 11 and the refrigerant so as to increase the temperature of the coolant, such that the high-temperature coolant may be supplied to the heater core 40.

Accordingly, the coolant whose temperature is increased while passing through the condenser 120 may sequentially pass through the water pump 20 and the coolant heater 30 along the coolant line 11, and be introduced into the heater core 40.

Here, the high-temperature coolant introduced into the heater core 40 may increase the temperature of the ambient air passing through the heater core 40. In other words, the introduced ambient air may be converted to a high-temperature state while passing through the heater core 40 and then introduced into the vehicle interior, thereby implementing heating of the vehicle interior.

In addition, the coolant having passed through the heater core 40 may be introduced into the first valve 50 along the coolant line 11. Thereafter, the coolant may flow from the first valve 50 along the first connection line 52 and the coolant line 11, and may be introduced back into the condenser 120.

While repeatedly performing the above-described processes, the heat pump system may smoothly heat the vehicle interior by using the heat supplied from the air conditioner unit 100.

The third mode operated as above may be operated when a temperature of the heat storage device 12 is lower than the temperature of the refrigerant discharged from the compressor 110, and the heat stored in the heat storage device 12 are completely exhausted.

Meanwhile, when the temperature of air discharged into the vehicle interior is lower than the target temperature in the third mode, the coolant heater 30 may be operated to heat the coolant supplied to the heater core 40 along the coolant line 11.

In other words, the coolant heater 30 may heat the coolant introduced through the coolant line 11 such that the temperature of the coolant supplied to the heater core 40 may be increased.

Therefore, as described above, when a heat pump system for a vehicle according to an embodiment is applied, the temperature of the coolant by selectively using the heat supplied from the air conditioner unit 100 or the heat supplied from the heat storage device 12 may be increased, and the vehicle interior by using the coolant whose temperature is increased may be efficiently heated.

In addition, according to the present disclosure, the heating performance by using the heat storage device 12 may be maximized while minimizing the required components, and accordingly, streamlining and simplification of the system may be achieved.

In addition, according to the present disclosure, at the time of heating the vehicle interior, usage of an electric heater may be minimized, such that the battery consumption may be reduced, and the overall driving distance of the vehicle may be increased.

In addition, according to an embodiment, it is possible to reduce manufacturing cost and weight through simplification of an entire system, and to improve space utilization.

While this present disclosure has been described in connection with what is presently considered to be practical embodiments, it is to be understood that the present disclosure is not limited to the disclosed embodiments. On the contrary, it is intended to cover various modifications and equivalent arrangements included within the spirit and scope of the appended claims.

DESCRIPTION OF SYMBOLS

10: vehicle interior heating device
11: coolant line
12: heat storage device
20: water pump
30: coolant heater
40: heater core
50: first valve
52: first connection line
60: second valve
62: second connection line
100: air conditioner unit
102: refrigerant line
110: compressor
120: condenser
130: expansion valve
140: evaporator

What is claimed is:

1. A heat pump system for a vehicle, comprising:

a vehicle interior heating device comprising a heat storage device, a water pump, and a heater core, which are connected to each other through a coolant line through which a coolant flows; and an air conditioner unit comprising a compressor, a condenser, an expansion valve, and an evaporator, which are connected to each other through a refrigerant line through which a refrigerant flows, wherein the condenser is provided on the coolant line between the heat storage device and the water pump to flow the coolant, and configured to condense the refrigerant through heat-exchange with the coolant, wherein the flow of the coolant is controlled based on at least one mode for heating the vehicle interior, wherein the vehicle interior heating device further comprises:

a first valve provided on the coolant line between the heat storage device and the heater core;

a first connection line including a first end connected to the first valve and a second end connected to the coolant line between the heat storage device and the condenser;

a second valve provided on the coolant line between the heat storage device and the condenser; and a second connection line including a first end connected to the second valve and a second end connected to the coolant line between the condenser and the water pump, wherein the at least one mode comprises:

a first mode for heating the vehicle interior by using the heat stored in the heat storage device;

a second mode for heating the vehicle interior by simultaneously using the heat stored in the heat storage device and the heat supplied from the air conditioner unit; and a third mode for heating the vehicle interior by using the heat supplied from the air conditioner unit, and wherein, in the first mode:

the coolant line connecting the heat storage device and the heater core is opened by an operation of the first valve;

the coolant line connecting the condenser and the second valve is closed by an operation of the second valve;

the coolant line connecting a second end of the second connection line and the condenser is closed;

the first connection line is closed by the operation of the first valve;

the second connection line is opened by the operation of the second valve;

the coolant circulates along the coolant line and the second connection line by an operation of the water pump;

the heat storage device increases a temperature of the coolant introduced through the coolant line such that the high-temperature coolant is supplied to the heater core; and an operation of the air conditioner unit is stopped.

2. The heat pump system of claim 1, wherein the first valve is configured to open the first connection line and close the coolant line connecting the first valve and the heat storage device to prevent coolant from flowing into the heat storage device when the heat storage device has exhausted all stored heat.

3. The heat pump system of claim 1, wherein the second valve opens the second connection line and closes the coolant line connecting the condenser and the second valve such that a temperature of the coolant is increased by the heat stored in the heat storage device.

4. The heat pump system of claim 1, wherein the first valve and the second valve is a 3-way valve configured to distribute flow amounts while controlling the flow of the coolant.

5. The heat pump system of claim 1, wherein the first mode is operated when a temperature of the heat storage device is higher than a heating target temperature.

6. The heat pump system of claim 1, wherein, in the second mode:

the coolant line connecting the heat storage device and the heater core is opened by an operation of the first valve;

the coolant line connecting the heat storage device and the condenser is opened by an operation of the second valve;

the first connection line is closed by the operation of the first valve;

the second connection line is closed by the operation of the second valve;

the heat storage device, the water pump, the heater core, and the condenser are interconnected through the coolant line;

the coolant circulates along the coolant line by an operation of the water pump;

the air conditioner unit is operated; and the condenser and the heat storage device increase a temperature of the coolant introduced through the coolant line such that the high-temperature coolant is supplied to the heater core.

7. The heat pump system of claim 1, wherein the second mode is operated when a temperature of the heat storage device is lower than the temperature of the refrigerant discharged from the compressor.

8. The heat pump system of claim 1, wherein, in the third mode:

the coolant line connecting the heat storage device and the first valve is closed by an operation of the first valve;

the coolant line connecting the heat storage device and the condenser is closed by an operation of the second valve;

the first connection line is opened by the operation of the first valve;

the second connection line is closed by the operation of the second valve;

the coolant circulates along the coolant line and the first connection line opened by an operation of the water pump;

the air conditioner unit is operated; and the condenser exchanges heat between the coolant introduced through the coolant line and the refrigerant to increase a temperature of the coolant such that the high-temperature coolant is supplied to the heater core.

9. The heat pump system of claim 1, wherein the third mode is operated when a temperature of the heat storage device is lower than the temperature of the refrigerant discharged from the compressor, and the heat stored in the heat storage device are completely exhausted.

10. The heat pump system of claim 1, wherein the vehicle interior heating device further comprises a coolant heater provided on the coolant line between the water pump and the heater core.

11. The heat pump system of claim 10, wherein, when a temperature of air discharged into the vehicle interior is lower than a heating target temperature in the at least one mode, the coolant heater is operated to heat the coolant supplied to the heater core along the coolant line.

12. The heat pump system of claim 1, wherein the heat storage device is filled with a phase-change material.

* * * * *